(12) United States Patent
Wu et al.

(10) Patent No.: US 12,254,385 B2
(45) Date of Patent: Mar. 18, 2025

(54) METHOD FOR MULTI-TIME SCALE VOLTAGE QUALITY CONTROL BASED ON REINFORCEMENT LEARNING IN A POWER DISTRIBUTION NETWORK

(71) Applicant: Tsinghua University, Beijing (CN)

(72) Inventors: Wenchuan Wu, Beijing (CN); Haotian Liu, Beijing (CN); Hongbin Sun, Beijing (CN); Bin Wang, Beijing (CN); Qinglai Guo, Beijing (CN)

(73) Assignee: Tsinghua University, Beijing (CN)

( * ) Notice: Subject to any disclaimer, the term of this patent is extended or adjusted under 35 U.S.C. 154(b) by 901 days.

(21) Appl. No.: 17/389,558

(22) Filed: Jul. 30, 2021

(65) Prior Publication Data
US 2022/0405633 A1    Dec. 22, 2022

(30) Foreign Application Priority Data
Jun. 17, 2021   (CN) .......................... 202110672200.1

(51) Int. Cl.
*G06N 20/00*    (2019.01)
(52) U.S. Cl.
CPC .................................... *G06N 20/00* (2019.01)
(58) Field of Classification Search
CPC ..................................................... G06N 20/00
See application file for complete search history.

(56) References Cited

U.S. PATENT DOCUMENTS

2020/0119556 A1*   4/2020   Shi ........................... G06N 3/08

OTHER PUBLICATIONS

Wang, S., Duan, J., Shi, D., Xu, C., Li, H., Diao, R., & Wang, Z. (Nov. 2020). A data-driven multi-agent autonomous voltage control framework using deep reinforcement learning. IEEE Transactions on Power Systems, 35(6), 4644-4654. (Year: 2020).*
Shuang et al., "Multi-time-scale Online Optimization for Reactive Power of Distribution Network Based on Deep Reinforcement Learning," Power System Automation, May 5, 2021, vol. 45, No. 10.
CNIPA, Office Action issued for CN Application No. 202110672200. 1, Nov. 20, 2023.

* cited by examiner

*Primary Examiner* — Michael J Huntley
*Assistant Examiner* — Maggie Thanh Maido
(74) *Attorney, Agent, or Firm* — Hodgson Russ LLP

(57) ABSTRACT

A method for multi-time scale reactive voltage control based on reinforcement learning in a power distribution network is provided, which relates to the field of power system operation and control. The method includes: constituting an optimization model for multi-time scale reactive voltage control in a power distribution network based on a reactive voltage control object of a slow discrete device and a reactive voltage control object of a fast continuous device in the power distribution network; constructing a hierarchical interaction training framework based on a two-layer Markov decision process based on the model; setting a slow agent for the slow discrete device and setting a fast agent for the fast continuous device; and deciding action values of the controlled devices by each agent based on measurement information inputted, so as to realize the multi-time scale reactive voltage control while the slow agent and the fast agent perform continuous online learning.

1 Claim, No Drawings

METHOD FOR MULTI-TIME SCALE VOLTAGE QUALITY CONTROL BASED ON REINFORCEMENT LEARNING IN A POWER DISTRIBUTION NETWORK

CROSS-REFERENCE TO RELATED APPLICATION

This application claims priority to Chinese Patent Application No. 202110672200.1, filed Jun. 17, 2021, the entire disclosure of which is incorporated by reference herein.

FIELD

The disclosure relates to the technical field of power system operation and control, and more particularly to a method for multi-time scale reactive voltage control based on reinforcement learning in a power distribution network.

BACKGROUND

In recent years, "carbon emission peak" and "carbon neutrality" have become strategic goals of our economic and social development, which put forward arduous tasks for an energy system, especially a power system. Based on rapid development of renewable energy power generation (DG) in the 21st century, a transition to clean and low-carbon energy may be further promoted and development of non-fossil energy may be accelerated, especially wind power, solar power and other new energy sources.

As the continuous increase in penetration rate of the DG in a power distribution network, the operation of the power distribution network is caused to face challenges. The refined control and optimization are thus becoming more and more important. In order to cope with a series of problems caused by the continuous increase in penetration rate of the distributed new energy, such as reverse delivery of powers, voltage violations, power quality deterioration, device disconnection, etc., a capability for controlling flexible resources is mined. A reactive voltage control system in the power distribution network has become a key component of improving a safe operation level of the power distribution network, reducing operating costs, and promoting consumption of the distributed resources. However, the current field application of reactive voltage control systems in the power distribution network often adopts a model-driven optimization paradigm, i.e., relying on accurate network models to establish optimization problems and solve control strategies. However, in engineering practice, the reliability of model parameters of the power distribution network is low, and a huge scale and a frequent change result in high maintenance costs for the model. Also, it is difficult to accurately model the influences of external networks and the device characteristics. Due to the influences of the incomplete model, conventional model-driven control system in a regional power grid faces major challenges such as inaccurate control, difficult to implement and promote. Therefore, data-driven model-free optimization methods, are important means for grid reactive voltage control, especially deep reinforcement learning methods that have developed rapidly in recent years.

However, controllable resources in the power distribution network have various types and different characteristics, especially differences in the time scale, which brings fundamental difficulties to data-driven methods and reinforcement learning methods. If a single time scale method is adopted, a waste of controllable resources will be caused and the consumption of renewable energy and may not be fully increased. For example, an installed capacity of DG as a flexible resource is often greater than its rated active power and has a fast response speed. There is a lot of adjustable space. The continuous reactive power set values may be quickly set. In contrast, controllable resources such as on-load tap changers (OLTCs) and capacitor stations have a huge impact on the power distribution network, but they can only adjust fixed gears and produce discrete control actions. At the same time, the interval between actions is long, and there are costs such as wearing. As these two types of devices have serious differences in the action nature and time scale, there is no good solution in the related art to coordinate and optimize the two types of devices under the condition of inaccurate models for the power distribution network. Generally, rough feedback methods are adopted, which is difficult to ensure the optimal operation of the power distribution network.

Therefore, it is necessary to study a method for multi-time scale reactive voltage control in a power distribution network, which can coordinate multi-time scale reactive power resources in the power distribution network for reactive voltage control, without requiring an accurate model for the power distribution network. Online learning of control process data achieves optimal reactive voltage control under the condition of incomplete models. At the same time, since the multi-time scale reactive voltage control in the power distribution network requires continuous online operation, it is necessary to ensure high safety, high efficiency, and high flexibility, so as to greatly improve the voltage quality of the power grid and reduce the network loss of the power grid.

SUMMARY

The purpose of the disclosure is to overcome the deficiencies in the related art and provide a method for multi-time scale reactive voltage control based on reinforcement learning in a power distribution network. The disclosure is specifically suitable for use of power distribution network with serious problems due to the incomplete models, which not only saves the high cost caused by repeated maintenance of accurate models, but also fully mines capabilities of controlling multi-time scale controllable resources guarantees voltage safety and economic operation of the power distribution network to the greatest extent, and be suitable for a large-scale promotion.

A method for multi-time scale reactive voltage control based on reinforcement learning in a power distribution network is provided in the disclosure. The method includes: determining a multi-time scale reactive voltage control object based on a reactive voltage control object of a slow discrete device and a reactive voltage control object of a fast continuous device in a controlled power distribution network, and establishing constraints for multi-time scale reactive voltage optimization, to constitute an optimization model for multi-time scale reactive voltage control in the power distribution network; constructing a hierarchical interaction training framework based on a two-layer Markov decision process based on the model; setting a slow agent for the slow discrete device and setting a fast agent for the fast continuous device; and performing online control with the slow agent and the fast agent, in which action values of the controlled devices are decided by each agent based on measurement information inputted, so as to realize the multi-time scale reactive voltage control while the slow agent and the fast agent perform continuous online learning and updating. The method includes the following steps.

1) determining the multi-time scale reactive voltage control object and establishing the constraints for multi-time scale reactive voltage optimization, to constitute the optimization model for multi-time scale reactive voltage control in the power distribution network comprises:

1-1) determining the multi-time scale reactive voltage control object of the controlled power distribution network:

$$O_T = \min_{T_O, T_B} \sum_{\tilde{t}=0}^{\tilde{T}-1} \left[ C_O T_{O,loss}^{(k\tilde{t})} + C_B T_{B,loss}^{(k\tilde{t})} + C_P \min_{Q_G, Q_C} \sum_{\tau=0}^{k-1} P_{loss}^{(k\tilde{t}+\tau)} \right] \quad (0.1)$$

where $\tilde{T}$ is a number of control cycles of the slow discrete device in one day; k is an integer which represents a multiple of a number of control cycles of the fast continuous device to the number of control cycles of the slow discrete device in one day; $T=k\tilde{T}$ is the number of control cycles of the fast continuous device in one day; $\tilde{t}$ is a number of control cycles of the slow discrete device; $T_O$ is a gear of an on-load tap changer OLTC; $T_B$ is a gear of a capacitor station; $Q_G$ is a reactive power output of the distributed generation DG; $Q_C$ is a reactive power output of a static var compensator SVC; $C_O, C_B, C_P$ respectively are an OLTC adjustment cost, a capacitor station adjustment cost and an active power network loss cost; $P_{loss}^{(k\tilde{t}+\tau)}$ is a power distribution network loss at the moment $k\tilde{t}+\tau$, $\tau$ being an integer, $\tau=0, 1, 2, \ldots, k-1$; $T_{O,loss}^{(k\tilde{t})}$ is a gear change adjusted by the OLTC at the moment $k\tilde{t}$, and $T_{B,loss}^{(k\tilde{t})}$ a gear change adjusted by the capacitor station at the moment $k\tilde{t}$, which are respectively calculated by the following formulas:

$$T_{O,loss}^{(k\tilde{t})} = \sum_{i=1}^{n_{OLTC}} \left| T_{O,i}^{(k\tilde{t})} - T_{O,i}^{(k\tilde{t}-k)} \right|, \tilde{t} > 0, i \in [1, n_{OLTC}] \quad (0.2)$$

$$T_{B,loss}^{(k\tilde{t})} = \sum_{i=1}^{n_{CB}} \left| T_{B,i}^{(k\tilde{t})} - T_{B,i}^{(k\tilde{t}-k)} \right|, \tilde{t} > 0, i \in [1, n_{CB}]$$

$$T_{O,loss}^{(0)} = T_{B,loss}^{(0)} = 0$$

where $T_{O,i}^{(k\tilde{t})}$ is a gear set value of an $i^{th}$ OLTC device at the moment $k\tilde{t}$, $n_{OLTC}$ is a total number of OLTC devices; $T_{B,i}^{(k\tilde{t})}$ is a gear set value of an $i^{th}$ capacitor station at the moment $k\tilde{t}$, and $n_{CB}$ is a total number of capacitor stations;

1-2) establishing the constraints for multi-time scale reactive voltage optimization in the controlled power distribution network:

voltage constraints and output constraints:

$$\underline{V} \leq V_i^{(k\tilde{t}+\tau)} \leq \overline{V},$$

$$|Q_{Gi}^{(k\tilde{t}+\tau)}| \leq \sqrt{S_{Gi}^2 - (P_{Gi}^{(k\tilde{t}+\tau)})^2},$$

$$\underline{Q_{Ci}} \leq Q_{Ci}^{(k\tilde{t}+\tau)} \leq \overline{Q_{Ci}},$$

$$\forall i \in N, \tilde{t} \in [0,T), \tau \in [0,k) \quad (0.3)$$

where N is a set of all nodes in the power distribution network, $V_i^{(k\tilde{t}+\tau)}$ is a voltage magnitude of the node i at the moment $k\tilde{t}+\tau$, $\underline{V}, \overline{V}$ are a lower limit and an upper limit of the node voltage respectively; $Q_{Gi}^{(k\tilde{t}+\tau)}$ is the DG reactive power output of the node i at the moment $k\tilde{t}+\tau$; $Q_{Ci}^{(k\tilde{t}+\tau)}$ is the SVC reactive power output of the node i at the moment $k\tilde{t}+\tau$; $\underline{Q_{Ci}}, \overline{Q_{Ci}}$ are a lower limit and an upper limit of the SVC reactive power output of the node i; $S_{Gi}$ is a DG installed capacity of the node i; $P_{Gi}^{(k\tilde{t}+\tau)}$ is a DG active power output at the moment $k\tilde{t}+\tau$ of the node i;

adjustment constraints:

$$1 \leq T_{O,i}^{(k\tilde{t})} \leq \overline{T_{O,i}}, \tilde{t} > 0 i \in [1, n_{OLTC}]$$

$$1 \leq T_{B,i}^{(k\tilde{t})} \leq \overline{T_{B,i}}, \tilde{t} > 0 i \in [1, n_{CB}] \quad (0.4)$$

where $\overline{T_{O,i}}$ is a number of gears of the $i^{th}$ OLTC device, and $\overline{T_{B,i}}$ is a number of gears of the $i^{th}$ capacitor station.

2) constructing the hierarchical interaction training framework based on the two-layer Markov decision process based on the optimization model established in step 1) and actual configuration of the power distribution network, comprises:

2-1) corresponding to system measurements of the power distribution network, constructing a state observation s at the moment t shown in the following formula:

$$s=(P, Q, V, T_O, T_B)_t \quad (0.5)$$

where P, Q are vectors composed of active power injections and reactive power injections at respective nodes in the power distribution network respectively; V is a vector composed of respective node voltages in the power distribution network; $T_O$ is a vector composed of respective OLTC gears, and $T_B$ is a vector composed of respective capacitor station gears; t is a discrete time variable of the control process, $(\cdot)_t$ represents a value measured at the moment t;

2-2) corresponding to the multi-time scale reactive voltage optimization object, constructing feedback variable $r_f$ of the fast continuous device shown in the following formula:

$$r_f = -C_P P_{loss}(s') - C_V V_{loss}(s') \quad (0.6)$$

$$P_{loss}(s') = \sum_{i \in N} P_i(s'),$$

$$V_{loss}(s') = \sqrt{\sum_{i \in N} \left[ [V_i(s') - \overline{V}]_+^2 + [\underline{V} - V_i(s')]_+^2 \right]}$$

where s,a,s' are a state observation at the moment t, an action of the fast continuous device at the moment t and a state observation at the moment t+1 respectively; $P_{loss}(s')$ is a network loss at the moment t+1; $V_{loss}(s')$ is a voltage deviation rate at the moment t+1; $P_i(s')$ is the active power output of the node i at the moment t+1; $V_i(s')$ is a voltage magnitude of the node i at the moment t+1; $[x]_+=\max(0,x)$; $C_V$ is a cost coefficient of voltage violation probability;

2-3) corresponding to the multi-time scale reactive voltage optimization object, constructing feedback variable $r_s$ of the slow discrete device shown in the following formula:

$$r_s = -C_O T_{O,loss}(\tilde{s}, \tilde{s}') - C_B T_{B,loss}(\tilde{s}, \tilde{s}') - R_f(\{s_\tau, a_\tau | \tau \in [0, k)\}, s_k) \quad (0.7)$$

where $\tilde{s}, \tilde{s}''$ are a state observation at the moment $k\tilde{t}$ and a state observation at the moment $k\tilde{t}+k$ respectively; $T_{O,loss}(\tilde{s}, \tilde{s}')$ is an OLTC adjustment cost generated by actions at the moment $k\tilde{t}$; $T_{B,loss}(\tilde{s}, \tilde{s}')$ is a capacitor station adjustment cost generated by actions at the moment $k\tilde{t}$; $R_f(\{s_\tau, a_\tau | \tau \in [0,k)\}, s_k)$ is a feedback value of the fast continuous device accumulated between two actions of the slow discrete device, the calculation expression of which is as follows:

$$R_f(\{s_\tau, a_\tau | \tau \in [0, k)\}, s_k) = \sum_{\tau=0}^{k-1} r_f(s_\tau, a_\tau, s_{\tau+1}) \quad (0.8)$$

2-4) constructing an action variable $a_t$ of the fast agent and an action variable $\tilde{a}_t$ of the slow agent at the moment t shown in the following formula:

$$a_t = (Q_G, Q_C)_t$$

$$\tilde{a}_t = (T_O, T_B)_t \quad (0.9)$$

where $Q_G$, $Q_C$ are vectors of the DG reactive power output and the SVC reactive power output in the power distribution network respectively;

3) setting the slow agent to control the slow discrete device and setting the fast agent to control the fast continuous device, comprise:

3-1) the slow agent is a deep neural network including a slow strategy network $\tilde{\pi}$ and a slow evaluation network $Q_s^{\tilde{\pi}}$, wherein an input of the slow strategy network $\tilde{\pi}$ is $\tilde{s}$, an output is probability distribution of an action $\tilde{a}$, and a parameter of the slow strategy network $\tilde{\pi}$ is denoted as $\theta_s$; an input of the slow evaluation network $Q_s^{\tilde{\pi}}$ is $\tilde{s}$, an output is an evaluation value of each action, and a parameter of the slow evaluation network $Q_s^{\tilde{\pi}}$ are denoted as $\phi_s$;

3-2) the fast agent is a deep neural network including a fast strategy network $\pi$ and a fast evaluation network $Q_f^{\pi}$, wherein an input of the fast strategy network $\pi$ is s, an output is probability distribution of the action a, and a parameter of the fast strategy network $\pi$ is denoted as $\theta_f$; an input of the fast evaluation network $Q_f^{\pi}$ is (s,a), an output is an evaluation value of actions, and a parameter of the fast evaluation network $Q_f^{\pi}$ is denoted as $\phi_f$;

4) initializing parameters:

4-1) randomly initializing parameters of the neural networks corresponding to respective agents $\theta_s$, $\theta_f$, $\phi_s$, $\phi_f$;

4-2) inputting a maximum entropy parameter $\alpha_s$ of the slow agent and a maximum entropy parameter $\alpha_f$ of the fast agent;

4-3) initializing the discrete time variable as t=0, an actual time interval between two steps of the fast agent is $\Delta t$, and an actual time interval between two steps of the slow agent is $k\Delta t$;

4-4) initializing an action probability of the fast continuous device as p=−1;

4-5) initializing cache experience database as $D_I = \emptyset$ and initializing agent experience database as $D = \emptyset$;

5) executing by the slow agent and the fast agent, the following control steps at the moment t:

5-1) judging if t mod k≠0: if yes, going to step 5-5) and if no, going to step 5-2);

5-2) obtaining by the slow agent, state information from measurement devices in the power distribution network;

5-3) judging if $D_I \neq \emptyset$: if yes, calculating $r_s$, adding an experience sample to D, updating $D \leftarrow D \cup \{(\tilde{s}, \tilde{a}, r_s, \tilde{s}', D_I)\}$ and going to step 5-4); if no, directly going to step 5-4);

5-4) updating $\tilde{s}$ to $\tilde{s}'$;

5-5) generating the action $\tilde{a}$ of the slow discrete device with the slow strategy network $\tilde{\pi}$ of the slow agent according to the state information $\tilde{s}$;

5-6) distributing $\tilde{a}'$ to each slow discrete device to realize the reactive voltage control of each slow discrete device at the moment t;

5-7) obtaining by the fast agent, state information s' from measurement devices in the power distribution network;

5-8) judging if p≥0: if yes, calculating $r_f$, adding an experience sample to $D_I$, updating $D_I \leftarrow D_I \cup \{(s, a, r_f, s', p)\}$ and going to step 5-9); if no, directly going to step 5-9);

5-9) updating s to s';

5-10) generating the action a of the slow discrete device with the fast strategy network $\pi$ of the fast agent according to the state information s and updating p=π(a|s);

5-11) distributing a to each fast continuous device to realize the reactive voltage control of each fast continuous device at the moment t and going to step 6);

6) judging t mod k=0: if yes, going to step 6-1); if no, going to step 7);

6-1) randomly selecting a set of experiences $D^B \in D$ from the agent experience database D, wherein a number of samples in the set of experiences is B;

6-2) calculating a loss function of the parameter $\phi_s$ with each sample in $D^B$:

$$L(\phi_s) = \underset{\tilde{s}, \tilde{a}, r_s, \tilde{s}'}{E} \left[ (Q_s^\pi(\tilde{s}, \tilde{a}) - \omega y_s)^2 \right] \quad (0.10)$$

where $$y_s = r_s + \gamma [Q_s^\pi(\tilde{s}', \tilde{a}') - \alpha_s \log \tilde{\pi}(\tilde{a}'|\tilde{s})] \quad (0.11)$$

where $\tilde{a}' \sim \tilde{\pi}(\cdot|\tilde{s})$ and $\gamma$ is a conversion factor;

$$\omega = \prod_{i=0}^{k-1} \frac{\pi(a_i|s_i)}{p(a_i|s_i)} \quad (0.12)$$

6-3) updating the parameter $\phi_s$:

$$\phi_s \leftarrow \phi_s - \rho_s \nabla_{\phi_s} L(\phi_s) \quad (0.13)$$

where $\rho_s$ is a learning step length of the slow discrete device;

6-4) calculating a loss function of the parameter $\theta_s$:

$$L(\theta_s) = - \underset{\tilde{s} \in D^B}{E} \left[ Q_s^\pi(\tilde{s}, \tilde{a} \sim \tilde{\pi}_{\theta_s}(\cdot|\tilde{s})) \right] \quad (0.14)$$

6-5) updating the parameter $\theta_s$:

$$\theta_s \leftarrow \theta_s - \rho_s \nabla_{\theta_s} L(\theta_s) \quad (0.15)$$

and going to step 7);

7) executing by the fast agent, the following learning steps at the moment t:

7-1) randomly selecting a set of experiences $D^B \in D$ from the agent experience database D, wherein a number of samples in the set of experiences is B;

7-2) calculating a loss function of the parameter $\phi_f$ with each sample in $D^B$:

$$L(\phi_f) = \underset{s, a, r_f, s'}{E} \left[ (Q_f^\pi(s, a) - y_f)^2 \right] \quad (0.16)$$

where $$y_f = r_f + \gamma [Q_f^\pi(s', a') - \alpha_f \log \pi(a'|s)] \quad (0.17)$$

where $a' \sim \pi(\cdot|s)$;

7-3) updating the parameter $\phi_f$:

$$\phi_f \leftarrow \phi_f - \rho_f \nabla_{\phi_f} L(\phi_f) \quad (0.18)$$

where $\rho_f$ is a learning step length of the fast continuous device;

7-4) calculating a loss function of the parameter $\theta_f$;

$$L(\theta_f) = - \underset{\tilde{s} \in D^B}{E}\left[Q_f^T\left(\tilde{s}, \tilde{a} \sim \tilde{\pi}_{\theta_f}(\cdot | \tilde{s})\right)\right] \quad (0.19)$$

7-5) updating the parameter $\theta_f$:

$$\theta_f \leftarrow \theta_f - \rho_f \nabla_{\theta_f} L(\theta_f) \quad (0.20)$$

8) let t=t+1, returning to step 5).

The advantages and beneficial effects of the disclosure lie in:

the reactive power voltage control problem in the disclosure is established as a two-layer Markov decision process, the slow agent is set for a long-time scale device (such as an OLTC, a capacitor station, etc.), and the fast agent is set for a short-time scale device (such as a DG, a static var compensator SVC, etc.). The agents are implemented by reinforcement learning algorithms. The method for hierarchical reinforcement learning according to the present disclosure is used for training, the convergence is efficiently optimized in the interactive control, and each agent may independently decide the action value of the controlled device according to the inputted measurement information, thereby achieving the multi-time scale reactive voltage control. On the one hand, the controllable resources of the multi-time scale devices are fully used, the fast and slow devices are fully decoupled in the control phase to perform fast and slow coordinated multi-time scale reactive voltage control. On the other hand, the method for hierarchical reinforcement learning is proposed with high efficiency, in which a joint learning of fast and slow agents is realized by interaction factors, mutual interferences between the fast and slow agents are avoided in the learning, historical data may be fully used of for learning, an optimal strategy of each agent is quickly obtained, thereby ensuring the optimal operation of the system with incomplete models.

1. Compared with the conventional method for multi-time-scale reactive voltage control, the method for multi-time scale reactive voltage control based on reinforcement learning in a power distribution network according to the disclosure has model-free characteristics, that is, the optimal control strategy may be obtained through online learning without requiring accurate models of the power distribution network. Further, the disclosure may avoid control deterioration caused by model errors, thereby ensuring the effectiveness of reactive voltage control, improving the efficiency and safety of power grid operation, and being suitable for deployment in actual power systems.

2. A fast agent and a slow agent in the disclosure are separately established for the fast continuous device and the slow discrete device. In the control phase, the two agents are fully decoupled, and multi-time scale control commands may be generated. Compared with the conventional method for reactive voltage control based on reinforcement learning, the method in the disclosure may ensure that the adjustment capabilities of the fast continuous device and the slow discrete device are used to the greatest extent, thereby fully optimizing the operation states of the power distribution network and improving the consumption of renewable energy.

3. In the learning process of the fast agent and the slow agent, the joint learning of multi-time-scale agents is realized in the disclosure by interaction factors, mutual interferences between the agents are avoided in the learning phase, and the fast convergence is realized in the reinforcement learning process. In addition, full mining of massive historical data is also supported with high sample efficiency and a fully optimized control strategy may be obtained after a few iterations in the disclosure, which is suitable for scenarios of lacking samples in the power distribution network.

4. The disclosure may realize continuous online operation of the multi-time scale reactive voltage control in the power distribution network, ensure the high safety, high efficiency and high flexibility of the operation, thereby greatly improving the voltage quality of the power grid, reducing the network loss of the power grid and having very high application value.

DETAILED DESCRIPTION

A method for multi-time scale reactive voltage control based on reinforcement learning in a power distribution network is provided in the disclosure. The method includes: determining a multi-time scale reactive voltage control object based on a reactive voltage control object of a slow discrete device and a reactive voltage control object of a fast continuous device in a controlled power distribution network, and establishing constraints for multi-time scale reactive voltage optimization, to constitute an optimization model for multi-time scale reactive voltage control in the power distribution network; constructing a hierarchical interaction training framework based on a two-layer Markov decision process based on the model; setting a slow agent for the slow discrete device and setting a fast agent for the fast continuous device; and performing online control with the slow agent and the fast agent, in which action values of the controlled devices are decided by each agent based on measurement information inputted, so as to realize the multi-time scale reactive voltage control while the slow agent and the fast agent perform continuous online learning and updating. The method includes the following steps.

1) according to a reactive voltage control object of a slow discrete device (which refers to a device that performs control by adjusting gears in an hour-level action cycle, such as an OLTC, a capacitor station, etc.) and a reactive voltage control object of a fast continuous device (which refers to a device that performs control by adjusting continuous set values in minute-level action cycle, such as a distributed generation DG, a static var compensator SVC, etc.) in the controlled power distribution network, the multi-time scale reactive voltage control object is determined, and optimization constraints are established for multi-time scale reactive voltage control, to constitute the optimization model for multi-time scale reactive voltage control in the power distribution network. The specific steps are as follows.

1-1) the multi-time scale reactive voltage control object of the controlled power distribution network is determined:

$$O_T = min_{T_O, T_B} \sum_{i=0}^{\tilde{T}-1}\left[C_O T_{O,loss}^{(k\tilde{i})} + C_B T_{B,loss}^{(k\tilde{i})} + C_P min_{Q_G, Q_C} \sum_{\tau=0}^{k-1} P_{loss}^{(k\tilde{i}+\tau)}\right] \quad (0.21)$$

where $\tilde{T}$ is a number of control cycles of the slow discrete device in one day; k is an integer which represents a multiple of a number of control cycles of the fast continuous device to the number of control cycles of the slow discrete device in one day; $T=k\tilde{T}$ is the number of control cycles of the fast continuous device in one day; $\tilde{t}$ is a number of control cycles of the slow discrete device; $T_O$ is a gear of an on-load tap changer OLTC; $T_B$ is a gear of a capacitor station; $Q_G$ is a reactive power output of the distributed generation DG; $Q_C$ is a reactive power output of a static var compensator SVC; $C_O, C_B, C_P$ respectively are an OLTC adjustment cost, a capacitor station adjustment cost and an active power network loss cost; $P_{loss}^{(k\tilde{t}+\tau)}$ is a power distribution network loss at the moment $k\tilde{t}+\tau$, $\tau$ being an integer, $\tau=0, 1, 2 \ldots, k-1$; $T_{O,loss}^{(k\tilde{t})}$ is a gear change adjusted by the OLTC at the moment $k\tilde{t}$, and $T_{B,loss}^{(k\tilde{t})}$ is a gear change adjusted by the capacitor station at the moment $k\tilde{t}$, which are respectively calculated by the following formulas:

$$T_{O,loss}^{(k\tilde{t})} = \sum_{i=1}^{n_{OLTC}} |T_{O,i}^{(k\tilde{t})} - T_{O,i}^{(k\tilde{t}-k)}|, \tilde{t} > 0, i \in [1, n_{OLTC}] \quad (0.22)$$

$$T_{B,loss}^{(k\tilde{t})} = \sum_{i=1}^{n_{CB}} |T_{B,i}^{(k\tilde{t})} - T_{B,i}^{(k\tilde{t}-k)}|, \tilde{t} > 0, i \in [1, n_{CB}]$$

$$T_{O,loss}^{(0)} = T_{B,loss}^{(0)} = 0$$

where $T_{O,i}^{(k\tilde{t})}$ is a gear set value of an $i^{th}$ OLTC device at the moment $k\tilde{t}$, $n_{OLTC}$ is a total number of OLTC devices; $T_{B,i}^{(k\tilde{t})}$ is a gear set value of an $i^{th}$ capacitor station at the moment $k\tilde{t}$, and $n_{CB}$ is a total number of capacitor stations;

1-2) the constraints are established for multi-time scale reactive voltage optimization in the controlled power distribution network:

the constraints for reactive voltage optimization are established according to actual conditions of the controlled power distribution network, including voltage constraints and output constraints expressed by:

$$\underline{V} \leq V_i^{(k\tilde{t}+\tau)} \leq \overline{V},$$

$$|Q_{Gi}^{(k\tilde{t}+\tau)}| \leq \sqrt{S_{Gi}^2 - (P_{Gi}^{(k\tilde{t}+\tau)})^2},$$

$$\underline{Q_{Ci}} \leq Q_{Ci}^{(k\tilde{t}+\tau)} \leq \overline{Q_{Ci}},$$

$$\forall i \in N, \tilde{t} \in [0, T), \tau \in [0, k) \quad (0.23)$$

where N is a set of all nodes in the power distribution network, $V_i^{(k\tilde{t}+\tau)}$ is a voltage magnitude of the node i at the moment $k\tilde{t}+\tau$, $\underline{V}, \overline{V}$ are a lower limit and an upper limit (the typical values are respectively 0.9 and 1.1) of the node voltage respectively; $Q_{Gi}^{(k\tilde{t}+\tau)}$ is the DG reactive power output of the node i at the moment $k\tilde{t}+\tau$; $Q_{Ci}^{(k\tilde{t}+\tau)}$ is the SVC reactive power output of the node i at the moment $k\tilde{t}+\tau$; $\underline{Q_{Ci}}, \overline{Q_{Ci}}$ are a lower limit and an upper limit of the SVC reactive power output of the node i; $S_{Gi}$ is a DG installed capacity of the node i; $P_{Gi}^{(k\tilde{t}+\tau)}$ is a DG active power output at the moment $k\tilde{t}+\tau$ of the node i;

adjustment constraints are expressed by:

$$1 \leq T_{O,i}^{(k\tilde{t}+\tau)} \leq \overline{T_{O,i}}, \tilde{t} > 0, i \in [1, n_{OLTC}]$$

$$1 \leq T_{B,i}^{(k\tilde{t}+\tau)} \leq \overline{T_{B,i}}, \tilde{t} > 0, i \in [1, n_{CB}] \quad (0.24)$$

where $\overline{T_{O,i}}$ is a number of gears of the $i^{th}$ OLTC device, and $\overline{T_{B,i}}$ is a number of gears of the $i^{th}$ capacitor station.

2) in combination with the optimization model established in step 1) and actual configuration of the power distribution network, the hierarchical interaction training framework based on the two-layer Markov decision process is constructed. The specific steps are as follows:

2-1) corresponding to system measurements of the power distribution network, a state observation s at the moment t is constructed in the following formula:

$$s=(P, Q, V, T_O, T_B)_t \quad (0.25)$$

where P, Q are vectors composed of active power injections and reactive power injections at respective nodes in the power distribution network respectively; V is a vector composed of respective node voltages in the power distribution network; $T_O$ is a vector composed of respective OLTC gears, and $T_B$ is a vector composed of respective capacitor station gears; t is a discrete time variable of the control process, $(\cdot)_t$ represents a value measured at the moment t;

2-2) corresponding to the multi-time scale reactive voltage optimization object, feedback variable $r_f$ of the fast continuous device is constructed in the following formula:

$$r_f = -C_P P_{loss}(s') - C_V V_{loss}(s') \quad (0.26)$$

$$P_{loss}(s') = \sum_{i \in N} P_i(s'),$$

$$V_{loss}(s') = \sqrt{\sum_{i \in N} \left[[V_i(s') - \overline{V}]_+^2 + [\underline{V} - V_i(s')]_+^2\right]}$$

where s,a,s' are a state observation at the moment t, an action of the fast continuous device at the moment t and a state observation at the moment t+1 respectively; $P_{loss}(s')$ is a network loss at the moment t+1; $V_{loss}(s')$ is a voltage deviation rate at the moment t+1; $P_i(s')$ is the active power output of the node i at the moment t+1; $V_i(s')$ is a voltage magnitude of the node i at the moment t+1; $[x]_+ = \max(0, x)$; $C_V$ is a cost coefficient of voltage violation probability;

2-3) corresponding to the multi-time scale reactive voltage optimization object, feedback variable $r_s$ of the slow discrete device is constructed in the following formula:

$$r_s = -C_O T_{O,loss}(\tilde{s}, \tilde{s}') - C_B T_{B,loss}(\tilde{s}, \tilde{s}') - R_f(\{s_\tau, a_\tau | \tau \in [0, k)\}, s_k) \quad (0.27)$$

where are $\tilde{s}, \tilde{s}'$ a state observation at the moment $k\tilde{t}$ and a state observation at the moment $k\tilde{t}+k$ respectively; $T_{O,loss}(\tilde{s}, \tilde{s}')$ is an OLTC adjustment cost generated by actions at the moment $k\tilde{t}$; $T_{B,loss}(\tilde{s}, \tilde{s}')$ is a capacitor station adjustment cost generated by actions at the moment $k\tilde{t}$; $R_f(\{s_\tau, a_\tau | \tau \in [0, k)\}, s_k)$ is a feedback value of the fast continuous device accumulated between two actions of the slow discrete device, the calculation expression of which is as follows:

$$R_f(\{s_\tau, a_\tau | \tau \in [0, k)\}, s_k) = \sum_{\tau=0}^{k-1} r_f(s_\tau, a_\tau, s_{\tau+1}) \quad (0.28)$$

2-4) corresponding to each adjustable resource, an action variable $a_t$ of the fast agent and an action variable $\tilde{a}_t$ of the slow agent at the moment t are constructed in the following formula:

$$a_t = (Q_G, Q_C)_t$$

$$\tilde{a}_t = (T_O, T_B)_t \quad (0.29)$$

where $Q_G, Q_C$ are vectors of the DG reactive power output and the SVC reactive power output in the power distribution network respectively;

3) the slow agent is set to control the slow discrete device and the fast agent is set to control the fast continuous device. The specific steps are as follows.

3-1) the slow agent is implemented by a deep neural network including a slow strategy network $\tilde{\pi}$ and a slow evaluation network $Q_s^{\tilde{\pi}}$.

3-1-1) the slow strategy network $\tilde{\pi}$ is a deep neural network with an input being š and an output being probability distribution of an action ã, which includes several hidden layers (typically 2 hidden layers), each hidden layer having several neurons (typically 512 neurons), an activation function being the ReLU function, and a network parameter denoted as $\theta_s$;

3-1-2) the slow evaluation network $Q_s^{\tilde{\pi}}$ is a deep neural network with an input being š and an output being an evaluation value of each action, which includes several hidden layers (typically 2 hidden layers), each hidden layer having several neurons (typically 512 neurons), an activation function being the ReLU function, and a network parameter denoted as $\phi_s$;

3-2) the fast agent is implemented by a deep neural network including a fast strategy network $\pi$ and a fast evaluation network $Q_f^{\pi}$.

3-2-1) the fast strategy network $\pi$ is a deep neural network with an input being s and an output being probability distribution of the action a, which includes several hidden layers (typically 2 hidden layers), each hidden layer having several neurons (typically 512 neurons), an activation function being the ReLU function, and a network parameter denoted as $\theta_f$;

3-2-2) the fast evaluation network $Q_f^{\pi}$ is a deep neural network with an input being (s,a) and an output being an evaluation value of actions, which includes several hidden layers (typically 2 hidden layers), each hidden layer having several neurons (typically 512 neurons), an activation function being the ReLU function, and a network parameter denoted as $\phi_f$;

4) the variables in the relevant control processes are initialized.

4-1) parameters of the neural networks corresponding to respective agents $\theta_s$, $\theta_f$, $\phi_s$, $\phi_f$ are randomly initialized;

4-2) a maximum entropy parameter $\alpha_s$ of the slow agent and a maximum entropy parameter $\alpha_f$ of the fast agent are input, which are respectively configured to control the randomness of the slow and fast agents and a typical value of which is 0.01;

4-3) the discrete time variable is initialized as t=0, an actual time interval between two steps of the fast agent is $\Delta t$ and an actual time interval between two steps of the slow agent is $k\Delta t$, which are determined according to the actual measurements of the local controller and the command control speed;

4-4) an action probability of the fast continuous device is initialized as p=−1;

4-5) experience databases are initialized, in which cache experience database is initialized as $D_f = \emptyset$ and agent experience database is initialized as $D = \emptyset$;

5) the slow agent and the fast agent execute the following control steps at the moment t:

5-1) it is judged whether t mod k≠0. If yes, step 5-5) is performed and if no, step 5-2) is performed;

5-2) the slow agent obtains state information š' from measurement devices in the power distribution network;

5-3) it is judged whether $D_f \neq \emptyset$. If yes, $r_s$ is calculated, an experience sample is added to D, $D \leftarrow D \cup \{\tilde{s},\tilde{a},r_s,\tilde{s}',D_f\}$ is updated, and step 5-4) is performed; if no, step 5-4) is directly performed;

5-4) let š←š';

5-5) the action ã of the slow discrete device is generated with the slow strategy network $\tilde{\pi}$ of the slow agent according to the state information š;

5-6) ã is distributed to each slow discrete device to realize the reactive voltage control of each slow discrete device at the moment t;

5-7) the fast agent obtains state information s' from measurement devices in the power distribution network;

5-8) it is judged whether p≥0. If yes, $r_f$ is calculated, an experience sample is added to $D_f$, $D_f \leftarrow D_f \cup \{(s,a,r_f,s',p)\}$ is updated, and step 5-9) is performed; if no, step 5-9) is directly performed;

5-9) let s←s';

5-10) the action a of the fast continuous device is generated with the fast strategy network $\pi$ of the fast agent according to the state information s and p=$\pi$(a|s) is updated;

5-11) a is distributed to each fast continuous device to realize the reactive voltage control of each fast continuous device at the moment t and step 6) is performed;

6) it is judged whether t mod k=0. If yes, step 6-1) is performed; if no, step 7) is performed;

6-1) a set of experiences $D^B \in D$ is randomly selected from the agent experience database D, wherein a number of samples in the set of experiences is B (a typical value is 64);

6-2) a loss function of the parameter $\phi_s$ is calculated with each sample in $D^B$:

$$L(\phi_s) = \underset{\tilde{s},\tilde{a},r_s,\tilde{s}'}{E}\left[(Q_s^{\pi}(\tilde{s}, \tilde{a}) - \omega y_s)^2\right] \quad (0.30)$$

where $$\underset{\tilde{s},\tilde{a},r_s,\tilde{s}'}{E}$$

is taken from $D^B$ and $y_s$ is determined by:

$$y_s = r_s + \gamma[Q_s^{\pi}(\tilde{s}', \tilde{a}') - \alpha_s \log \tilde{\pi}(\tilde{a}'|\tilde{s})] \quad (0.31)$$

where $\tilde{a}' \sim \tilde{\pi}(\cdot|\tilde{s})$ and $\gamma$ is a conversion factor, a typical value of which is 0.98;

$$\omega = \prod_{i=0}^{k-1} \frac{\pi(a_i \mid s_i)}{p(a_i \mid s_i)} \quad (0.32)$$

6-3) the parameter $\phi_s$ is updated:

$$\phi_s \leftarrow \phi_s - \rho_s \nabla_{\phi_s} L(\phi_s) \quad (0.33)$$

where $\rho_s$ is a learning step length of the slow discrete device, a typical value of which is 0.0001;

6-4) a loss function of the parameter $\theta_s$ is calculated:

$$L(\theta_s) = -\underset{\tilde{s} \in D^B}{E}\left[Q_s^{\pi}(\tilde{s}, \tilde{a} \sim \tilde{\pi}_{\theta_s}(\cdot \mid \tilde{s}))\right] \quad (0.34)$$

6-5) the parameter $\theta_s$ is updated:

$$\theta_s \leftarrow \theta_s - \rho_s \nabla_{\theta_s} L(\theta_s) \quad (0.35)$$

and step 7) is then performed;
7) the fast agent executes the following learning steps at the moment t:
7-1) a set of experiences $D^B \in D$ is randomly selected from the agent experience database D, wherein a number of samples in the set of experiences is B (a typical value is 64);
7-2) a loss function of the parameter $\phi_f$ is calculated with each sample in $D^B$:

$$L(\phi_f) = \underset{s,a,r_f,s'}{E}\left[(Q_f^\pi(s,a) - y_f)^2\right] \quad (0.36)$$

where $$\underset{s,a,r_f,s'}{E}$$

is taken from $D^B$ and $y_f$ is determined by:

$$y_f = r_f + \gamma[Q_f^\pi(s',a') - \alpha_f \log \pi(a'|s)] \quad (0.37)$$

where $a' \sim \pi(\cdot|s)$;
7-3) the parameter $\phi_f$ is updated:

$$\phi_f \leftarrow \phi_f - \rho_f \nabla_{\phi_f} L(\phi_f) \quad (0.18)$$

where $\rho_f$ is a learning step length of the fast continuous device, a typical value of which is 0.00001;
7-4) a loss function of the parameter $\theta_f$ is calculated:

$$L(\theta_f) = -\underset{s \in D^B}{E}\left[Q_f^\pi\left(s, a \sim \pi_{\theta_f}(\cdot | s)\right)\right] \quad (0.39)$$

7-5) the parameter $\theta_f$ is updated:

$$\theta_f \leftarrow \theta_f - \rho_f \nabla_{\theta_f} L(\theta_f) \quad (0.20)$$

8) let t=t+1, it returns to step 5) and repeats the steps 5) to 8). The method is an online learning control method, which continuously runs online and updates the neural network, while performing online control until the user manually stops it.

What is claimed is:
1. A method for multi-time scale reactive voltage control based on reinforcement learning in a power distribution network, comprising:
determining a multi-time scale reactive voltage control object based on a reactive voltage control object of a slow discrete device and a reactive voltage control object of a fast continuous device in a controlled power distribution network, and establishing constraints for multi-time scale reactive voltage optimization, to constitute an optimization model for multi-time scale reactive voltage control in the power distribution network;
constructing a hierarchical interaction training framework based on a two-layer Markov decision process based on the model;
setting a slow agent for the slow discrete device and setting a fast agent for the fast continuous device; and
performing online control with the slow agent and the fast agent, in which action values of the controlled devices are decided by each agent based on measurement information inputted, so as to realize the multi-time scale reactive voltage control while the slow agent and the fast agent perform continuous online learning and updating, wherein a power distribution network model of the power distribution network is incomplete, the power distribution network comprises the slow discrete device and the fast continuous device, the slow discrete device comprises an on-load tap changer and a capacitor station, and the fast continuous device comprises a distributed generation and a static var compensator; and wherein the method further comprises:
1) determining the multi-time scale reactive voltage control object and establishing the constraints for multi-time scale reactive voltage optimization, to constitute the optimization model for multi-time scale reactive voltage control in the power distribution network comprises:
1-1) determining the multi-time scale reactive voltage control object of the controlled power distribution network:

$$O_T = \min_{T_O, T_B} \sum_{\tilde{t}=0}^{\tilde{T}-1}\left[C_O T_{O,loss}^{(k\tilde{t})} + C_B T_{B,loss}^{(k\tilde{t})} + C_P \min_{Q_G, Q_C} \sum_{\tau=0}^{k-1} P_{loss}^{(k\tilde{t}+\tau)}\right] \quad (0.1)$$

where $\tilde{T}$ is a number of control cycles of the slow discrete device in one day; k is an integer which represents a multiple of a number of control cycles of the fast continuous device to the number of control cycles of the slow discrete device in one day; $T=k\tilde{T}$ is the number of control cycles of the fast continuous device in one day; $\tilde{t}$ is a number of control cycles of the slow discrete device; $T_O$ is a gear of the on-load tap changer OLTC; $T_B$ is a gear of the capacitor station; $Q_G$ is a reactive power output of the distributed generation DG; $Q_C$ is a reactive power output of the static var compensator SVC; $C_O$, $C_B$, $C_P$ respectively are an OLTC adjustment cost, a capacitor station adjustment cost and an active power network loss cost; $P_{loss}^{(k\tilde{t}+\tau)}$ is a power distribution network loss at the moment $k\tilde{t}+\tau$, $\tau$ being an integer, loss $\tau=0, 1, 2, \ldots, k-1$; and $T_{O,loss}^{(k\tilde{t})}$ loss is a gear change adjusted by the OLTC at the moment $k\tilde{t}$, and $T_{B,loss}^{(k\tilde{t})}$ is a gear change adjusted by the capacitor station at the moment $k\tilde{t}$, which are respectively calculated by the following formulas:

$$T_{O,loss}^{(k\tilde{t})} = \sum_{i=1}^{n_{OLTC}}\left|T_{O,i}^{(k\tilde{t})} - T_{O,i}^{(k\tilde{t}-k)}\right|, \tilde{t} > 0, i \in [1, n_{OLTC}] \quad (0.2)$$

$$T_{B,loss}^{(k\tilde{t})} = \sum_{i=1}^{n_{CB}}\left|T_{B,i}^{(k\tilde{t})} - T_{B,i}^{(k\tilde{t}-k)}\right|, \tilde{t} > 0, i \in [1, n_{CB}]$$

$$T_{O,loss}^{(0)} = T_{B,loss}^{(0)} = 0$$

where $T_{O,i}^{(k\tilde{t})}$ is a gear set value of an $i^{th}$ OLTC device at the moment $k\tilde{t}$, $n_{OLTC}$ is a total number of OLTC devices; $T_{B,i}^{(k\tilde{t})}$ is a gear set value of an $i^{th}$ capacitor station at the moment $k\tilde{t}$, and $n_{CB}$ is a total number of capacitor stations;

1-2) establishing the constraints for multi-time scale reactive voltage optimization in the controlled power distribution network which include:

voltage constraints and output constraints:

$$\underline{V} \leq V_i^{(k\tilde{t}+\tau)} \leq \overline{V},$$

$$|Q_{Gi}^{(k\tilde{t}+\tau)}| \leq \sqrt{S_{Gi}^2 - (P_{Gi}^{(k\tilde{t}+\tau)})^2},$$

$$\underline{Q_{Ci}} \leq Q_{Ci}^{(k\tilde{t}+\tau)} \leq \overline{Q_{Ci}},$$

$$\forall i \in N, \tilde{t} \in [0,T), \tau \in [0,k) \qquad (0.3)$$

where N is a set of all nodes in the power distribution network, $V_i^{(k\tilde{t}+\tau)}$ is a voltage magnitude of the node i at the moment $k\tilde{t}+\tau$, $\underline{V}, \overline{V}$ are a lower limit and an upper limit of the node voltage respectively; $Q_{Gi}^{(k\tilde{t}+\tau)}$ is the DG reactive power output of the node i at the moment $k\tilde{t}+\tau$; $Q_{Ci}^{(k\tilde{t}+\tau)}$ is the SVC reactive power output of the node i at the moment $k\tilde{t}+\tau$; $\underline{Q_{Ci}}, \overline{Q_{Ci}}$ are a lower limit and an upper limit of the SVC reactive power output of the node i; $S_G$ is a DG installed capacity of the node i; $P_{Gi}^{(k\tilde{t}+\tau)}$ is a DG active power output at the moment $k\tilde{t}+\tau$ of the node i;

adjustment constraints:

$$1 \leq T_{O,i}^{(k\tilde{t})} \leq \overline{T_{O,i}}, \tilde{t} > 0 i \in [1, n_{OLTC}]$$

$$1 \leq T_{B,i}^{(k\tilde{t})} \leq \overline{T_{B,i}}, \tilde{t} > 0 i \in [1, n_{CB}] \qquad (0.4)$$

where $\overline{T_{O,i}}$ is a number of gears of the $i^{th}$ OLTC device, and $\overline{T_{B,i}}$ is a number of gears of the $i^{th}$ capacitor station;

2) constructing the hierarchical interaction training framework based on the two-layer Markov decision process based on the optimization model established in step 1) and actual configuration of the power distribution network, comprises:

2-1) corresponding to system measurements of the power distribution network, constructing a state observation S at the moment t shown in the following formula:

$$s = (P, Q, V, T_O, T_B)_t \qquad (0.5)$$

where P, Q are vectors composed of active power injections and reactive power injections at respective nodes in the power distribution network respectively; V is a vector composed of respective node voltages in the power distribution network; $T_O$ is a vector composed of respective OLTC gears, and $T_B$ is a vector composed of respective capacitor station gears; t is a discrete time variable of the control process, $(\cdot)_t$ represents a value measured at the moment t;

2-2) corresponding to the multi-time scale reactive voltage optimization object, constructing feedback variable $r_f$ of the fast continuous device shown in the following formula:

$$r_f = -C_P P_{loss}(s') - C_V V_{loss}(s') \qquad (0.6)$$

$$P_{loss}(s') = \sum_{i \in N} P_i(s'),$$

$$V_{loss}(s') = \sqrt{\sum_{i \in N} [[V_i(s') - \overline{V}]_+^2 + [\underline{V} - V_i(s')]_+^2]}$$

where s, a, s' are a state observation at the moment t, an action of the fast continuous device at the moment t and a state observation at the moment t+1 respectively; $P_{loss}(s')$ is a network loss at the moment t+1; $V_{loss}(s')$ is a voltage deviation rate at the moment t+1; $P_i(s')$ is the active power output of the node i at the moment t+1; $V_i(s')$ is a voltage magnitude of the node i at the moment t+1; $[x]_+ = \max(0,x)$; $C_V$ is a cost coefficient of voltage violation probability;

2-3) corresponding to the multi-time scale reactive voltage optimization object, constructing feedback variable $r_s$ of the slow discrete device shown in the following formula:

$$r_s = -C_O T_{O,loss}(\tilde{s}, \tilde{s}') - C_B T_{B,loss}(\tilde{s}, \tilde{s}') - R_f(\{s_\tau, a_\tau | \tau \in [0, k)\}, s_k) \qquad (0.7)$$

where $\tilde{s}, \tilde{s}'$ are a state observation at the moment $k\tilde{t}$ and a state observation at the moment $k\tilde{t}+k$; $T_{O,loss}(\tilde{s},\tilde{s}')$ is an OLTC adjustment cost generated by actions at the moment $k\tilde{t}$; $T_{B,loss}(\tilde{s}, \tilde{s}')$ is a capacitor station adjustment cost generated by actions at the moment $k\tilde{t}$; $R_f(\{s_\tau, a_\tau | \tau \in [0,k)\}, s_k)$ is a feedback value of the fast continuous device accumulated between two actions of the slow discrete device, the calculation expression of which is as follows:

$$R_f(\{s_\tau, a_\tau | \tau \in [0, k)\}, s_k) = \sum_{\tau=0}^{k-1} r_f(s_\tau, a_\tau, s_{\tau+1})$$

2-4) constructing an action variable $a_t$ of the fast agent and an action variable $\tilde{a}_t$ of the slow agent at the moment t shown in the following formula:

$$a_t = (Q_G, Q_C)_t$$

$$\tilde{a}_t = (T_O, T_B)_t \qquad (0.9)$$

where $Q_G$, $Q_C$ are vectors of the DG reactive power output and the SVC reactive power output in the power distribution network;

3) setting the slow agent to control the slow discrete device and setting the fast agent to control the fast continuous device, comprise:

3-1) the slow agent is a deep neural network including a slow strategy network $\tilde{\pi}$ and a slow evaluation network $Q_s^{\tilde{\pi}}$, wherein an input of the slow strategy network $\tilde{\pi}$ is $\tilde{s}$, an output is probability distribution of an action $\tilde{a}$, and a parameter of the slow strategy network $\tilde{\pi}$ is denoted as $\theta_s$; an input of the slow evaluation network $Q_s^{\tilde{\pi}}$ f is $\tilde{s}$, an output is an evaluation value of each action, and a parameter of the slow evaluation network $Q_s^{\tilde{\pi}}$ are denoted as $\phi_s$;

3-2) the fast agent is a deep neural network including a fast strategy network $\pi$ and a fast evaluation network $Q_f^{\pi}$, wherein an input of the fast strategy network $\pi$ is s, an output is probability distribution of the action a, and a parameter of the fast strategy network $\pi$ is denoted as $\theta_f$; an input of the fast evaluation network $Q_f^{\pi}$ is (s,a), an output is an evaluation value of actions, and a parameter of the fast evaluation network $Q_f^{\pi}$ is denoted as $\phi_f$;

4) initializing parameters:

4-1) randomly initializing parameters of the neural networks corresponding to respective agents $\theta_s$, $\theta_f$, $\phi_s$, $\phi_f$;

4-2) inputting a maximum entropy parameter as of the slow agent and a maximum entropy parameter $\alpha_f$ of the fast agent;

4-3) initializing the discrete time variable as t=0, an actual time interval between two steps of the fast agent is $\Delta t$, and an actual time interval between two steps of the slow agent is $k\Delta t$;

4-4) initializing an action probability of the fast continuous device as p=−1;

4-5) initializing cache experience database as $D_l=\emptyset$ and initializing agent experience database as $D=\emptyset$;

5) executing by the slow agent and the fast agent, the following control steps at the moment t:

5-1) judging if t mod k≠0: if yes, going to step 5-5) and if no, going to step 5-2);

5-2) obtaining by the slow agent, state information from measurement devices in the power distribution network;

5-3) judging if $D_l\neq\emptyset$: if yes, calculating $r_s$, adding an experience sample to D, updating $D\leftarrow D=\{(\tilde{s},\tilde{a},r_s,\tilde{s}',D_l)\}$ and going to step 5-4); if no, directly going to step 5-4);

5-4) updating $\tilde{s}$ to $\tilde{s}'$;

5-5) generating the action $\tilde{a}$ of the slow discrete device with the slow strategy network $\tilde{\pi}$ of the slow agent according to the state information $\tilde{s}$;

5-6) distributing $\tilde{a}$ to each slow discrete device to realize the reactive voltage control of each slow discrete device at the moment t;

5-7) obtaining by the fast agent, state information s' from measurement devices in the power distribution network;

5-8) judging if p ≥0: if yes, calculating $r_f$, adding an experience sample to $D_l$, updating $D_l\leftarrow D_l\cup\{(s,a,r_f,s',p)\}$, and going to step 5-9); if no, directly going to step 5-9);

5-9) updating s' to s;

5-10) generating the action a of the fast continuous device with the fast strategy network $\tilde{\pi}$ of the fast agent according to the state information s and updating p=π(a| s);

5-11) distributing a to each fast continuous device to realize the reactive voltage control of each fast continuous device at the moment t and going to step 6);

6) judging t mod k=0: if yes, going to step 6-1); if no, going to step 7);

6-1) randomly selecting a set of experiences $D^B \in D$ from the agent experience database D, wherein a number of samples in the set of experiences is B;

6-2) calculating a loss function of the parameter $\phi_s$ with each sample in $D^B$:

$$L(\phi_s) = \underset{\tilde{s},\tilde{a},r_s,\tilde{s}'}{E}\left[(Q_s^\pi(\tilde{s},\tilde{a})-\omega y_s)^2\right]$$

where $$y_s=r_s+\gamma[Q_s^\pi(\tilde{s}',\tilde{a}')-\alpha_s \log \tilde{\pi}(\tilde{a}'|\tilde{s})] \quad (0.11)$$

where $\tilde{a}'\sim\tilde{\pi}(\cdot|\tilde{s})$ and $\gamma$ is a conversion factor;

$$\omega = \prod_{i=0}^{k-1}\frac{\pi(a_i|s_i)}{p(a_i|s_i)} \quad (0.12)$$

6-3) updating the parameter $\phi_s$:

$$\phi_s\leftarrow\phi_s-\rho_s\nabla_{\phi_s}L(\phi_s) \quad (0.13)$$

where $\rho_s$ is a learning step length of the slow discrete device;

6-4) calculating a loss function of the parameter $\theta_s$;

$$L(\theta_s) = -\underset{\tilde{s}\in D^B}{E}\left[Q_s^\pi(\tilde{s},\tilde{a}\sim\tilde{\pi}_{\theta_s}(\cdot|\tilde{s}))\right] \quad (0.14)$$

6-5) updating the parameter $\theta_s$:

$$\theta_s\leftarrow\theta_s-\rho_s\nabla_{\theta_s}L(\theta_s) \quad (0.15)$$

and going to step 7);

7) executing by the fast agent, the following learning steps at the moment t:

7-1) randomly selecting a set of experiences $D^B\in D$ from the agent experience database D, wherein a number of samples in the set of experiences is B;

7-2) calculating a loss function of the parameter $\phi_f$ with each sample in $D^B$:

$$L(\phi_f) = \underset{s,a,r_f,s'}{E}\left[(Q_f^\pi(s,a)-y_f)^2\right] \quad (0.16)$$

where $$y_f=r_f+\gamma[Q_f^\pi(s',a')-\alpha_f \log \pi(a'|s)] \quad (0.17)$$

where $a'\sim\pi(\cdot|s)$;

7-3) updating the parameter $\phi_f$:

$$\phi_f\leftarrow\phi_f-\rho_f\nabla_{\phi_f}L(\phi_f) \quad (0.18)$$

where $\rho_f$ is a learning step length of the fast continuous device;

7-4) calculating a loss function of the parameter $\theta_f$;

$$L(\theta_f) = -\underset{s\in D^B}{E}\left[Q_f^\pi(s,a\sim\pi_{\theta_f}(\cdot|s))\right] \quad (0.19)$$

7-5) updating the parameter $\theta_f$:

$$\theta_f\leftarrow\theta_f-\rho_f\nabla_{\theta_f}L(\theta_f) \quad (0.20)$$

8) let t=t+1, returning to step 5).

\* \* \* \* \*